Patented Sept. 24, 1940

2,215,754

UNITED STATES PATENT OFFICE 2,215,754

PROCESS OF PURIFYING GASES CONTAINING SULPHUR COMPOUNDS AS IMPURITIES

Alvah J. W. Headlee, Morgantown, W. Va.

No Drawing. Application June 8, 1939,
Serial No. 278,153

6 Claims. (Cl. 23—3)

This invention relates to processes of purifying gases containing sulphur compounds as impurities, and it comprises processes wherein such gases are contacted with aqueous solutions of reagents capable of reacting with the sulphur compounds to form insoluble precipitates, the process being characterized by reacting the sulphur compounds in the gas with the precipitate-forming reagents in the presence of water-insoluble liquids to coat the precipitate with an oily, water-insoluble film and thus render it easily removed from the purification apparatus.

Many industrial gases, such as natural gas, illuminating gas, gases from the distillation of coal, and similar products contain sulphur compounds as impurities. Hydrogen sulphide is the more usual form in which the sulphur exists in such gases. Organic sulphur compounds are frequently encountered, however, and highly volatile mercaptans are examples of such impurities.

For most purposes to which such gases are put it is desirable that they be freed of their sulphur content. Natural gas is sometimes contaminated with small amounts of combined sulphur and before such natural gas is distributed for use it is important that it be purified. These sulphur compounds frequently are corrosive. Many of them, such as the mercaptans, have a highly disagreeable odor.

The purification of such industrial gases is practised on a wide scale. In making manufactured gas for domestic consumption it is common to free the gas of its sulphur content by contact thereof with iron oxide. Aqueous purification solutions are also used to some extent. These aqueous solutions function in such a way that the sulphur in combined form in the gas reacts with reagents dissolved in the solution to precipitate the sulphur as a relatively finely divided metal sulphide. For example, the water-soluble salts of copper, cadmium, antimony, tin, and similar compounds which form insoluble sulphides, have been suggested as reagents in aqueous solution for removing the sulphur compounds in the gas. Copper sulphate, as an illustration, will react, in aqueous solution, with hydrogen sulphide to form copper sulphide. When the solution of copper sulphate is exhausted it may readily be revivified for reuse by oxidizing its content of copper sulphide to copper sulphate.

However, the liquid reagent type of process has not met with particular favor in the art. The precipitated metal sulphides tend to clog the absorption apparatus. For superior gas and liquid contact it is desirable that the absorption apparatus have a baffle arrangement. Sometimes the absorption liquid is allowed to trickle down over plates where it meets an upward current of the gas to be purified. Since the reaction forming the insoluble sulphide is rapid the precipitated material tends to agglomerate on the plates of the absorption tower. Consequently, so-called dry methods of removing sulphur compounds from gases have been preferred in the art.

Natural gas occasionally contains appreciable quantities of sulphur compounds which must be removed. The ordinary sulphur-removing process is poorly adapted to conditions encountered in a natural gas field. What the art has desired is a convenient way of removing sulphur compounds from gases, natural gas in particular, but also applicable to other gases as aforesaid, in a simple, easily-handled way which can be practised by unskilled labor without difficulty. Such a method should be of the wet variety, namely, the gases should be passed through an aqueous purification liquid containing the proper reagents. This is because these solutions can be easily prepared for use and readily revivified, so the cost of removing the sulphur compounds is small. But for reasons hitherto brought out these wet methods have not, up to the present time, met with acceptance.

I have now discovered that the difficulties inherent in prior wet absorption methods can be overcome provided water-insoluble oily liquids are present while the sulphur-containing compounds are reacting with the absorption liquid. The oily liquids, I have discovered, coat the particles of the insoluble precipitate formed, thus acting as a kind of lubricant to prevent them from clogging the absorption apparatus. When the density of the oily liquid is less than that of the aqueous purification solution the oil-coated particles tend to collect on the surface of the aqueous liquid as a jelly-like layer which can be readily removed. Moreover, the presence of oily fluids has further advantages. The sulphur compounds in the gas are partially absorbed by the oily liquids, especially when these consist of hydrocarbons, such as gasolene, and thereafter the sulphur compounds react with the purification solution so that the purification process is in part a wholly liquid phase reaction analogous to the desulphurization of petroleum hydrocarbons. The oily liquids present aid in preventing evaporation of water from the aqueous solution thus reducing the tendency for the moisture content in the purified gas to be raised. Hydrolysis of the formed insoluble sulphide is also prevented.

In broad aspects then, the process of the present invention consists in modifying aqueous gas-desulphurizing processes by conducting the purification in the presence of water-insoluble oily liquids. There are many organic liquids which I can use as so-called lubricans for the sulphide precipitate. Most convenient among them is natural gasoline since it is readily available and cheap. Ordinarily straight run gasoline, gas oil, lubricating oil, and similar hydrocarbon fluids may also be used. My invention is not limited to hydrocarbon fluids, however, since I can use liquid esters of fatty acids provided conditions are such during the purification that there is no tendency for the esters to saponify and yield insoluble metal soaps. Ethyl acetate is another ester which is suitable but would not be used because of its high cost.

Consequently, for practical purposes aliphatic hydrocarbon fluids are best, but I have enumerated other kinds of water-insoluble liquids so that the breadth of the present invention may be clearly appreciated.

In the practice of the present invention I prepare an aqueous solution of a water-soluble salt, such as cupric chloride, whose sulphide is insoluble. This aqueous solution can have widely varying strengths. I then charge the solution into any suitable absorption tower, or simply an ordinary container into which the gas to be purified may be admitted, the container having an outlet to permit the purified gas to leave. To this solution I then add a relatively small amount of gasoline to act as the precipitate lubricant. The purification liquid in the container is agitated and the impure gas admitted. Hydrogen sulphide, or organic sulphides in the gas react at once with the cupric chloride to form copper sulphide. The particles of copper sulphide then become coated with the gasoline present and the liquids separate into two layers with a jelly-like mass of copper sulphide between. The entire contents of the absorption vessel can then be discharged and the upper layers of gasoline and jelly-like copper sulphide separated by stratification. It is unnecessary to wash out the absorption vessel since no copper sulphide clings to the surfaces thereof.

Thus, more specifically, 10 pounds of copper chloride are dissolved in 100 pounds of water to which is added 1 gallon of natural gasoline having a specific gravity of .73. This purification mixture is then charged into a suitable gas scrubbing device and the gas to be purified admitted thereto. The sulphur compounds in the gas precipitate as insoluble copper sulphides which are coated with films of the gasoline. The agitation caused by bubbling the gas through the mixture is sufficient to keep the gasoline coarsely emulsified in the aqueous solution so that the particles of copper sulphide can be quickly coated therewith. When all the copper chloride is converted to copper sulphide the purification liquid can be drained from the drainer.

A natural gas stream at a temperature of 40° F. and a pressure of 225 pounds per square inch, and having a dew-point of 30° F. will absorb less than 10 pounds of water from the above solution by the passage of two million cubic feet of gas through the scrubber during a twenty-four hour period. This very low absorption of water by the gas is due to the presence of the gasoline. The evaporation of water from aqueous solutions used to purify natural gas is a rather serious problem in the art since large quantities of moisture in the gas are undesirable. Should the temperature of a gas highly charged with moisture decrease during distribution or transmission water will separate out and this is undesirable. Use of water-insoluble fluids in the present invention markedly reduces evaporation.

Buffers can be added to the solution of copper chloride to control the acidity during the purification if desired. Small amounts of caustic soda can be used for this purpose.

The present process is operative under all conditions met with in the purification of natural gas, illuminating gas and other industrial gases containing sulphur compounds as an impurity. The gas to be desulphurized may be treated at its normal pressure, or at reduced pressures without changing the process in any way.

Having thus described my invention, what I claim is:

1. In the process of removing sulphur compounds from gases containing the same as impurities therein by contacting such gases with aqueous solutions containing reagents which form insoluble sulphides, the method of preventing clogging in absorption apparatus containing such solutions which comprises mixing such gases with such solutions in the presence of oily liquids immiscible with the aqueous solution, the solution being agitated to maintain the oily liquid disseminated throughout the solution so that the particles of insoluble sulphide formed become coated with the oily liquid.

2. In the process of removing sulphur compounds from natural gas by contacting the natural gas with aqueous solutions containing reagents which form insoluble sulphides, the method of preventing clogging in absorption apparatus containing such solutions which comprises mixing the natural gas with such solutions in the presence of oily liquids immiscible with the aqueous solution, the solution being agitated to maintain the oily liquid disseminated throughout the solution so that the particles of insoluble sulphide formed become coated with the oily liquid.

3. The process of removing hydrogen sulphide from natural gas containing the same so as to prevent clogging absorption apparatus containing aqueous solutions reactive with the hydrogen sulphide which comprises treating the natural gas with an aqueous solution of a copper salt in the presence of a liquid aliphatic hydrocarbon, the solution being agitated to maintain the hydrocarbon disseminated in the solution so that the particles of insoluble copper sulphide formed become coated with the liquid hydrocarbon.

4. In the aqueous process of removing sulphur compounds from gases containing the same as impurities therein by mixing the gas with aqueous solutions capable of forming insoluble metal sulphides, the method of preventing clogging in absorption apparatus containing such solutions which comprises agitating the mixture of gas and aqueous reagent in the presence of a water-insoluble oily liquid disseminated throughout the solution so that the particles of insoluble sulphide formed become coated with the oily liquid, and then permitting the solution to stratify to form a layer of oily liquid containing the insoluble sulphide particles.

5. The process as in claim 4 wherein the sulphide is precipitated as a copper sulphide.

6. The process as in claim 4 wherein the water-insoluble oily liquid is a liquid aliphatic hydrocarbon.

ALVAH J. W. HEADLEE.